UNITED STATES PATENT OFFICE.

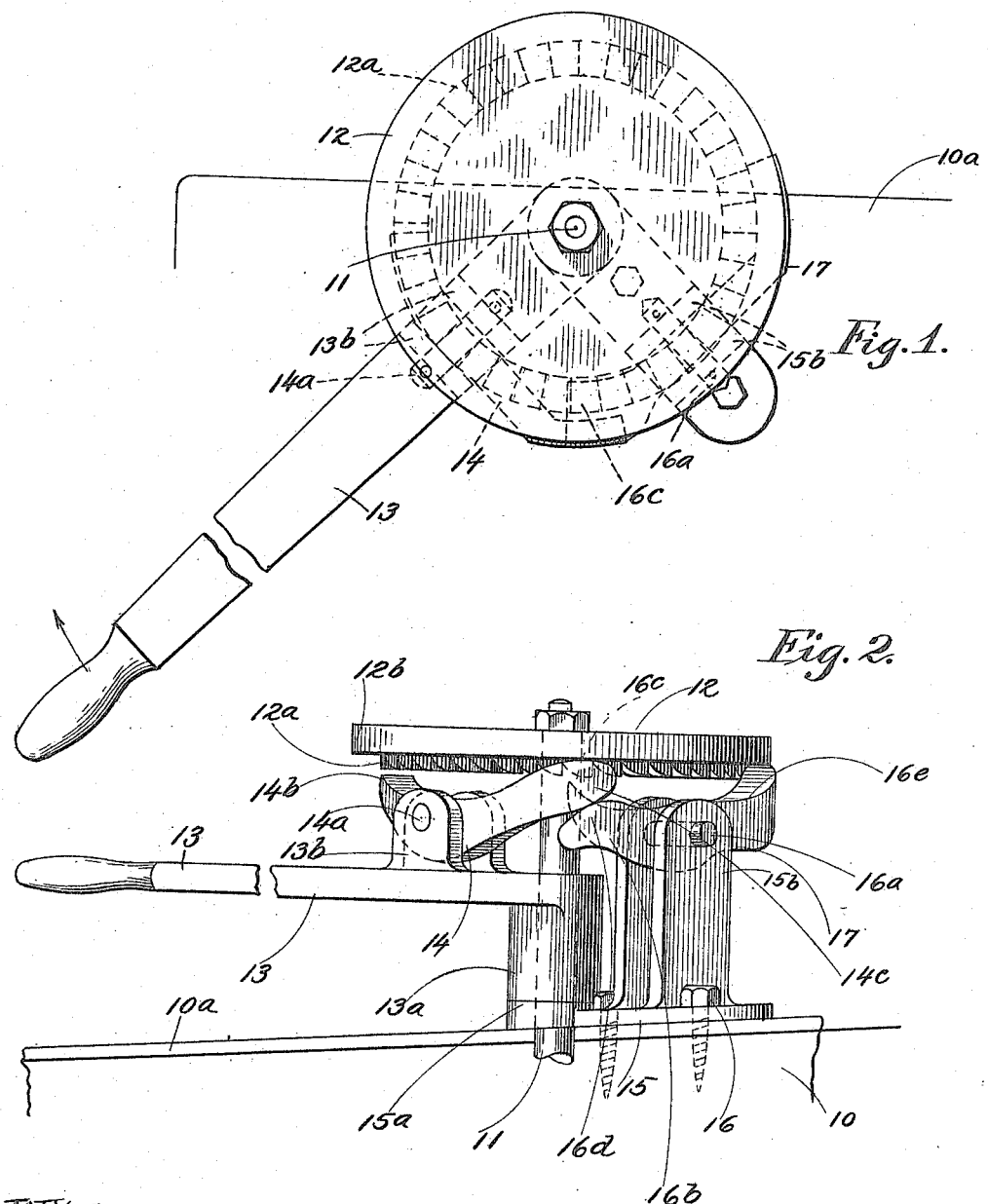

JAMES A. CARNEY, OF AURORA, ILLINOIS.

BRAKE-OPERATING MECHANISM.

1,273,147.  Specification of Letters Patent.  Patented July 23, 1918.

Application filed August 26, 1914. Serial No. 858,663.

*To all whom it may concern:*

Be it known that I, JAMES A. CARNEY, a citizen of the United States, residing at Aurora, in the county of Kane and State of Illinois, have invented certain new and useful Improvements in Brake-Operating Mechanism, of which the following is a specification.

This invention relates to improvements in brake operating mechanism. The object of this invention is to provide a brake operating mechanism which may be utilized with freight cars or the like and which comprises in combination with a vertically located rotating brake shaft, a horizontally located hand operating lever in combination with a ratchet wheel attached to the brake shaft together with a coacting pawl and a detent.

Still another object is to provide mechanism of the character described above so arranged and constructed that proper operation of the hand lever will operate to wind the brake shaft to apply the brakes and proper reverse movement thereof, when desired, will operate to positively disengage the detent and pawl.

Still another object is the provision of specific mechanism to carry out the above and other objects as is more fully set forth below and shown in the accompanying drawing, in which;

Figure 1 is a plan view showing my mechanism as attached to a car; and

Fig. 2 is a side elevation of the same.

Like numerals refer to like elements throughout the drawings, in which 10 designates generally a car roof or the like having the end rail 10$^a$ through which extends the rotatable brake shaft 11 connected by flexible members such as chains or the like, not shown, to the brake mechanism. The ratchet wheel 12 is secured to the upper portion of brake shaft 11 and is provided with the ratchet teeth 12$^a$ on its under surface. An operating handle or lever 13 is provided, this lever being provided with the angularly disposed hub 13$^a$ centrally apertured to rotatably fit around shaft 11. Upstanding lugs 13$^b$ are carried by the lever 13 and between these lugs is pivotally mounted the pawl 14 being attached and secured between the lugs 13$^b$ by means of the pin 14$^a$. This pawl 14 is curved, for a purpose to be described below, and is provided with the engaging end 14$^b$ adapted to engage the ratchet teeth 12$^a$. Adjacent its other extremity the pawl 14 is provided with the curved surfaces forming in effect a wedge 14$^c$. A plate 15 is attached to the car by means of bolts 16 or the like. This plate 15 is provided with the boss 15$^a$ apertured to permit passage therethrough of the shaft 11 and providing a seat for the hub portion 13$^a$ of handle 13. Projecting upwardly from the plate 15 are the parallel spaced apart flanges or brackets 15$^b$ between which is pivotally mounted a detent 17 attached thereto by means of the pin 16$^a$. This detent is provided with the portion 16$^b$ having the upwardly extending spur 16$^c$ and cam portion 16$^d$ adjacent thereto but downwardly inclined on its upper surface, as clearly shown in Fig. 2. The spur portion 16$^c$ is adapted to engage ratchet teeth 12$^a$ when in normal position, the detent 16 being provided with the curved rearwardly extending portion 16$^e$ of sufficient weight to normally maintain the spur 16$^c$ in engagement with ratchet teeth 12$^a$. The ratchet wheel 12 projects outwardly of the teeth 12$^a$ some distance constituting in effect a peripheral flange 12$^b$.

In the operation of my device when it is desired to apply the brakes the handle or lever 13 is moved in a direction indicated by the arrow in Fig. 1, during which movement the pawl 14 will coact with ratchet wheel 12 to rotate the shaft 11 and this movement may be repeated, the detent 16 maintaining its engagement with the ratchet 12 to prevent unwinding thereof. When it is desired to release the brakes the lever 13 is moved or rotated in a direction opposite to that indicated by the arrow until the extremity 14$^c$ of pawl 14 contacts with the undersurface of ratchet wheel flange 12$^b$ and upper surface of extremity 16$^d$ of detent 16. Further movement in the same direction of lever 13 will cause the wedge extremity 14$^c$ of pawl 14 to force detent 16 out of engagement with ratchet wheel 12, this disengaging movement being limited by contact of the curved extremity 16$^e$ of detent 16 contacting with under-surface of flange 12$^b$ of ratchet wheel 12.

It will be apparent that this mechanism is simple and efficient in operation and does away with necessity of separate operations and mechanism to accomplish the release of the brake mechanism, simple manipulation of the lever 13, as described above, being all that is necessary.

While I have shown and described my device with more or less particularity, I do not wish to be restricted to such showing or description beyond the scope of the appended claims.

What I claim is:—

1. A device of the class described comprising a ratchet member substantially horizontally arranged, an operating lever also substantially horizontally arranged, a pawl pivotally attached to said lever and normally engaging said ratchet member whereby proper rotation of said lever will effect rotation in one direction of said ratchet member, and a detent arranged to prevent reverse rotation of said ratchet, said pawl being arranged to positively disengage said detent upon proper movement of said lever.

2. In combination with a substantially vertical brake operating shaft, a substantially horizontally arranged ratchet member secured thereto, an operating lever rotatably mounted thereon, a pawl pivotally mounted on said lever and normally engaging said ratchet member, and a detent normally engaging said ratchet member, said pawl being arranged to coact with said ratchet member and said detent member upon proper movement of said lever to disengage itself and said detent.

3. In combination with a substantially vertical brake operating shaft, a substantially horizontally arranged ratchet wheel secured thereto, said ratchet wheel being provided with ratchet teeth on one side thereof, an operating lever rotatably mounted adjacent said ratchet wheel, a pawl pivotally attached to said lever and normally engaging said ratchet wheel to effect rotation of said wheel in one direction upon proper movement of said lever, a detent member pivotally mounted adjacent said ratchet wheel and normally engaging the same to prevent reverse rotation thereof, and means associated with said pawl and detent for effecting the disengagement of both said pawl and detent with said ratchet wheel upon proper movement of said lever.

4. In combination with a vertically arranged brake shaft, a horizontally disposed ratchet member mounted thereon, a lever rotatably mounted on said shaft, a pawl actuated by said lever and normally engaging said ratchet member to effect rotation thereof on proper movement of the lever, a detent arranged normally to engage said ratchet member to prevent reverse rotation thereof, said pawl and detent having parts adapted to coact upon proper movement of the lever to effect the disengagement of both the pawl and detent with said ratchet member, and means to limit the disengaging movements of said pawl and detent.

5. In combination with a vertically arranged shaft, a horizontally disposed ratchet member mounted thereon and having teeth on one side thereof, an operating lever rotatably mounted on said shaft, a pawl pivotally mounted on said lever and actuated by gravity normally to engage said teeth, a bracket extending upwardly adjacent said shaft, and a detent pivotally mounted on said bracket and actuated by gravity normally to engage said teeth, said pawl and said detent carrying parts adapted to engage each other upon proper movement of said lever to move both said pawl and detent out of engagement with said teeth, said detent having a part adapted to engage a plane surface of said ratchet member to limit the disengaging movements of said pawl and detent.

6. In combination with a vertically arranged shaft, a horizontally disposed ratchet member having teeth on one side thereof, an operating handle rotatably mounted on said shaft, a pivotally mounted pawl actuated by said lever, and a detent pivotally mounted adjacent said ratchet member, said pawl and detent being actuated by gravity normally to engage said ratchet member and having parts adapted to coact with each other upon proper movement of the lever to effect the disengagement of both the pawl and detent with said ratchet member.

7. In combination with a substantially vertically located brake operating shaft, a ratchet wheel attached thereto, an operating lever rotatably mounted adjacent said ratchet wheel, the latter being provided with ratchet teeth on the side thereof adjacent said lever and being further provided with a peripheral flange, a pawl pivotally mounted on said lever, said pawl having a portion adapted to normally engage said ratchet teeth and also a disengaging portion, a detent pivotally mounted adjacent said ratchet wheel, said detent being provided with a portion normally engaging said ratchet teeth, and a cam portion, said detent being further provided with an extended arm. said disengaging portion of said pawl being adapted to coact with said cam portion of said detent and said peripheral flange of said ratchet wheel to effect disengagement of said pawl and detent from said ratchet teeth upon proper movement of said operating lever, said extended arm of said detent operating to limit said disengaging movement of said pawl and detent by contacting with said peripheral flange of said ratchet wheel.

8. In combination with a substantially vertically located brake operating shaft, a ratchet wheel attached thereto, an operating lever rotatably mounted adjacent said ratchet wheel, the latter being provided with ratchet teeth on the side thereof adjacent said lever and being further provided with a peripheral flange, a pawl pivotally mounted on said lever, said pawl having a portion adapted to normally engage said ratchet teeth and also a disengaging portion, a detent pivotally mounted adjacent said ratchet wheel, said detent being provided with a portion normally engaging said ratchet teeth, and a cam portion, said detent being further provided with an extended arm, said disengaging portion of said pawl being adapted to coact with said cam portion of said detent and said peripheral flange of said ratchet wheel to effect disengagement of said pawl and detent from said ratchet teeth upon proper movement of said operating lever, said extended arm of said detent operating to limit said disengaging movement of said pawl and detent by contacting with said peripheral flange of said ratchet wheel.

9. In combination with a car body and a substantially vertical brake-shaft rotatably secured thereto and extending above the roof thereof, a substantially horizontally arranged ratchet wheel mounted on said shaft above said roof, teeth on the under face of said wheel, a peripheral flange on said wheel extending slightly beyond said teeth, and means arranged between said wheel and said roof for engagement with said teeth for rotating said wheel and for preventing reverse movement thereof.

10. In a railway brake operating mechanism, the combination with a vertically mounted rotary shaft, of a ratchet wheel mounted on said shaft near one end thereof and arranged in a substantially horizontal plane, teeth on one face of said wheel, and a pawl adapted to coact with said teeth to rotate said shaft, said teeth being positioned inwardly of the outer periphery of said wheel to provide a flange whereby said wheel may be rotated by hand independently of said pawl.

In testimony whereof, I have subscribed my name.

JAMES A. CARNEY.

Witnesses:
E. J. BABBITT,
C. W. ROBERTSON.

Copies of this patent may be obtained for five cents each, by addressing the "Commissioner of Patents, Washington, D. C."